US006899746B2

(12) United States Patent
Lavrenko et al.

(10) Patent No.: US 6,899,746 B2
(45) Date of Patent: May 31, 2005

(54) METHOD OF PLATINUM PARTICLES RECOVERY FROM REACTION GAS IN THE PROCESS OF NITRIC ACID PRODUCTION AND GRANULAR COMPOSITE MATERIAL FOR RECOVERY OF SUCH PARTICLES

(75) Inventors: Antonina Oleksandrivna Lavrenko, Kharkov (UA); Dleksiy Yakovych Loboyko, Kharkov (UA); Grygoriy Ivanovych Gryn, Kharkov (UA); Tetyana Viktorivna Fedorchenko, Kharkov (UA); Pavlo Anatoliyovych Kozub, Kharkiv (UA)

(73) Assignee: Pryvatna Firma "Sit", Kharkiv (UA)

( * ) Notice: Subject to any disclaimer, the term of this patent is extended or adjusted under 35 U.S.C. 154(b) by 0 days.

(21) Appl. No.: 10/486,875
(22) PCT Filed: Aug. 19, 2002
(86) PCT No.: PCT/UA02/00035
§ 371 (c)(1), (2), (4) Date: Feb. 13, 2004
(87) PCT Pub. No.: WO03/015888
PCT Pub. Date: Feb. 27, 2003

(65) Prior Publication Data
US 2004/0197250 A1 Oct. 7, 2004

(30) Foreign Application Priority Data
Aug. 20, 2001 (UA) .................................... 2001085833

(51) Int. Cl.$^7$ .................. B01D 53/02; B01D 53/14
(52) U.S. Cl. ...................... 95/133; 95/900; 96/143; 96/153; 423/215.5; 502/405
(58) Field of Search ................. 95/90, 116, 133, 95/900; 96/108, 143, 153, 154; 423/210, 215.5; 502/400, 405

(56) References Cited

U.S. PATENT DOCUMENTS

| | | | | |
|---|---|---|---|---|
| 3,381,454 A | * | 5/1968 | Sponsel | 502/159 |
| 3,398,332 A | * | 8/1968 | Logan | 361/520 |
| 4,239,833 A | * | 12/1980 | Retmaniak et al. | 428/567 |
| 4,428,771 A | * | 1/1984 | Nowak et al. | 75/407 |
| 6,093,236 A | * | 7/2000 | Klabunde et al. | 95/128 |
| 6,315,816 B1 | * | 11/2001 | Cho et al. | 95/96 |
| 2004/0144251 A1 | * | 7/2004 | Mitsuda | 95/139 |

FOREIGN PATENT DOCUMENTS

| | | | |
|---|---|---|---|
| GB | 0830674 | * | 7/1957 |
| RU | 2 006 285 C1 | | 1/1994 |
| SU | 567487 | | 9/1978 |
| SU | 1353501 A1 | | 11/1987 |
| SU | 1699597 A1 | | 12/1991 |
| SU | 1720706 A1 | | 3/1992 |
| SU | 1787520 A1 | | 1/1993 |

OTHER PUBLICATIONS

Kozub, P. et al., "Investigations on Platinum Gauze Surfaces Used in the Manufacture of Nitric Acid," *Platinum Metals Rev.* 44(2):74–87, 2000.

* cited by examiner

*Primary Examiner*—Robert H. Spitzer
(74) *Attorney, Agent, or Firm*—Seed IP Law Group PLLC

(57) ABSTRACT

A granular composite material for recovering platinum particles from reaction gas flow in nitric acid production, comprising 50–75% calcium oxide by weight; 20–35% of magnesium oxide by weight; and 5–15% by weight of at least one chloride selected from the group consisting of calcium chloride and magnesium chloride; and a method of recovering platinum particles from reaction gas flow in nitric acid production comprising passing the reaction gas through a layer of a sorbent to absorb platinum particles, the sorbent being formed by the granular composite material described above, and extracting the absorbed platinum particles from the sorbent.

2 Claims, No Drawings

METHOD OF PLATINUM PARTICLES RECOVERY FROM REACTION GAS IN THE PROCESS OF NITRIC ACID PRODUCTION AND GRANULAR COMPOSITE MATERIAL FOR RECOVERY OF SUCH PARTICLES

The invention concerns a technology of production of nitric acid and can be used in the large-scale chemical production of nitric acid where the platinum catalysts are used at stage of ammonium oxidization to nitric oxide.

One of the basic stages of the large-scale production of nitric acid is conversion of ammonia to nitric oxide according to the formula:

$$4NH_3+5O_2=4NO+6H_2O$$

wherein the reaction is accompanied by forming of elementary nitrogen:

$$3NH_3+5O_2=2N_2+6H_2O,$$

amount of which is determined by type of the catalyst, composition of ammonium and air mixture, pressure, temperature and contact time between gas mixture and catalyst [1].

The prevalent type of catalyst is platinum alloy gauzes. The high catalytic activity of such alloys allows for reduced duration of the chemical process to about $10^{-4}$ sec, at temperature of 1123–1193 K and pressure up to 1.1 MPa with a theoretical yield of nitric oxide up to 95%. In the presence of the high temperature and the reaction mixture, crystalline particles form on the catalyst surface, which particles are broken off and taken away with the reaction mixture flow [2]. It results in catalyst substance losses in amount up to 30% of the initial weight of catalyst. The average loss of platinum metals is about 0.15–0.20 g per ton of nitric acid produced. At the large production volume, this value reaches 15–20 kg of platinum per annum for one industrial unit.

There are two main methods of the reduction of platinum metals loss in the nitric acid production: substitution of some part of platinum catalyst by less expensive analogues and separation of platinum catalyst particles from the reaction gas flow [3].

The available analogues of platinum alloys have lower activity (the contact time is $10^{-2}$–$10^{-3}$ sec), shorter operation time, narrower range of working temperature, and less selectivity (the yield of NO is, as a rule, 2–5% less than for platinum alloys). That is why platinum alloy catalysts are actively used.

Depending on recovery method it is possible to recuperate up to 96% of the lost platinum, which essentially allows to reduce the expenses of nitric acid production.

There are some methods of recovery of platinum catalyst particles with the help of gauzes made of an alloy containing such metals as gold, niobium, tantalum and thorium with palladium as the main component [4, 5]. The high cost of material of gauzes and loss of precious metals during operation are the main drawbacks of this method which makes its application economically inexpedient.

Another more effective method of recovering platinum particles from reaction gas flow is disclosed in [6]. The reaction gas passes through a set of gauzes made of palladium alloy and gold and through a layer of gas-permeability sorbent composed of the oxides of calcium and aluminum. However, the use of the second layer of the sorbent does not guarantee the high efficiency of the recovery of palladium, platinum and gold particles (the recovery efficiency does not exceed 65%) due to a low concentration of free calcium oxide which is the basic recovery agent. Moreover, this method requires the significant lump-sum investments.

Another method of recovering platinum catalyst particles comprises passing the reaction gas through natural substances containing oxides or carbonates of calcium, magnesium, strontium [7]. The method provides the recovery degree of platinum up to 88–96%. The low acid resistance of the adsorbent, impossibility of production the particles of the required shape from thereof, unstable composition of sorbent, low moisture resistance, unstable porosity and insufficient strength are the main shortcomings of this method.

In the closest prior art disclosed, a method of recovering precious metal particles in the flow of reaction gas comprises passing the reaction gas through the sorbent made of composition of calcium carbonate and cordierite in the ratio 1:(1–3.2) and a plasticizer (oleic acid and petrolatum) with the ratio to calcium carbonate being 1:(0.07–0.2):(0.25–0.6) and combustible additive with the ratio 1:(0.15–0.55) [8]. Plasticizer acts as a binding agent while burning process forms the calcium oxide, which is the main recovery component of the composition.

The main shortcoming of the closest prior art is the impossibility of obtaining the high concentration of precious metals in the used sorbent what is objectively determined by the high concentration of silicon oxide in the sorbent. High concentration of this component leads to binding of free calcium oxide in the compounds, which are inactive to the precious metals, and additionally it does not allow to obtain the sorbent of high porosity due to formation of calcium silicate film. As a result, the concentration of precious metals in the used sorbent does not exceed 0.5%.

Moreover, the presence of the silicates in the sorbent requires increased temperature of burning, as well as complicated equipment for hot molding and complicates the further extraction of precious metals from the used sorbent. The use of organic additives is hazardous for environment.

Thus, the mentioned shortcomings of the prior art are predetermined by the chemistry of interaction between the components of sorbent, and the components of sorbent and platinum metals, and therefore cannot be eliminated within the prior art.

The main objective of the present invention is to provide a high recovery degree of the precious metals in the flow of reaction in the process of nitric acid production and to develop the composite material of sorbent which will be free from the shortcomings of the prior art and will provide:

1. Concentration of platinum metals in the used catalyst up to 2.5%.
2. Formation of sorbent of predetermined composition and porosity.
3. Formation of sorbent granules with the required shape by using the method of wet molding.
4. Increasing of the sorbent strength.
5. Simplification of the process of recovering precious metals from the used sorbent.

The present invention provides the method of recovering platinum particles from the flow of the reaction gas in the process of nitric acid production, which includes passing the reaction gas through the layer of sorbent formed by a granular composite substance containing calcium oxide and binding agent with further extraction of the absorbed platinum particles from the used sorbent. The granular composite material is used as a sorbent, consisting of calcium oxide and binding agent which includes magnesium oxide and calcium chloride or/and magnesium chloride with the following components ratio, in weight %:

| | |
|---|---|
| calcium oxide | 50–75 |
| magnesium oxide | 20–35 |
| calcium chloride or/and magnesium chloride, converting to Cl$^-$ | 5–15. |

The optimal operation conditions for the application of the sorbent in today's technology of ammonia oxidation includes placing thereof directly under the catalytic gauzes but not closer than 100 mm to the lower catalytic gauze. The layer height is 50–100 mm. The flow of reaction gas (nitric oxide) with precious metals particles, going out from the catalytic gauzes, is passed through the layer of sorbent. Then the used sorbent is processed to extract the adsorbed particles. The experience has shown that the use of the proposed method allows for recovery up to 90% of precious metal particles taken away by the nitric oxide flow in the process of nitric acid production. The content of the precious metals in the sorbent can reach up to 2.5%.

The present invention also provides a granular composite material for recovering the platinum catalyst particles in the flow of nitric oxide in the process of nitric acid production, contains calcium oxide and a binding agent characterized in that being a binding agent it includes magnesium oxide and calcium or/and magnesium chloride at the following ratio of the components in the final product, weight %:

| | |
|---|---|
| Calcium oxide | 50–75 |
| Magnesium oxide | 20–35 |
| calcium chloride or/and magnesium chloride, converting to Cl$^-$ | 5–15. |

A special feature of the composition is that the initial mixture of milled calcium oxide, magnesium oxide and solution of their chlorides has the consistency allowing to form the granules with the required form and, after burning, it forms a durable material having high concentration of calcium and magnesium. The quantity of the initial components should be enough to provide the required composition of the final product.

The advantages of the proposed composite material are simplicity of production, availability of source materials, possibility of variation of content depending on service conditions. The material has a high moisture and acid resistance and can be easily recycled. These advantages are conditioned by a variety of interdependent conditions.

Firstly, for making the composite material, a mixture of substances of alkaline-earth metals (oxides, carbonate or chlorides) having the maximum recovery capability towards the platinum group metals is used. And wherein the composition of the composite material allows to obtain their maximum possible content.

Secondly, during the burning of the composite material, the substances of magnesium don't depress the recovery capability of the sorbent since, in contrast to substances of silicon and aluminum, they don't form the inactive substances like aluminates and silicates.

Thus, the concentration limits of the composite material are conditioned by the given working conditions. The increase of the magnesium oxide content to more than 35% reduces the recovery degree of precious metals to 20–30%, while decrease of the magnesium oxide content to less than 15% reduces the strength of the burnt sorbent to 3–4 MPa. Chlorides have binding power and that is why at less than 5% in concentration, the strength, the moisture and the acid resistance of the composite material become lower than allowed by the industry performance standards. On the other hand, the increase of chlorides concentration to more than 20% reduces the porosity of the material and decreases its recovery capability to 30–35%.

According to the invention the composite material is produced in a manner, the milled oxides of calcium and magnesium are mixed and a solution of chlorides of these metals with summary concentration 100–300 g/l are combined. The volume of the solution is selected to provide the necessary moisture to form granules of the required shape and the reduction ratio of oxides is selected to provide the required strength and porosity of the sorbent. The granules are dried at temperature less than 423 K and are burnt at temperature 1173–1223 K during 2–5 hours.

EXAMPLES

Example 1

According to the invention the composite material is produced in a manner, 300 g of magnesium oxide powder, 670 g calcium oxide powder and 170 g calcium chloride with 530 g water was mixed. The wet mass was mixed and granules with the required shape were formed. After drying, they were burnt at 1173–1223 K during 2–5 hours. The final material contains, evaluated in oxides and chlorine, % by weight: MgO—28, CaO—63, Cl$^-$—9. The layer of sorbent of 50 mm high was exploited in an industrial reactor during 1000 h under pressure of 0.6 MPa and the reaction gas flow rate of 50000 m$^3$/h. The concentration of platinum metals in sorbent was 1.2% and the recovery degree was 83% of the total amount of platinum metals involved by the gas.

Example 2

In accordance with the example 1 a composite material having the following final composition: MgO—20, CaO—73, Cl$^-$—7 was produced. The layer of sorbent of 150 mm high was exploited in an industrial reactor during 2000 h under pressure of 0.6 MPa and the reaction gas flow rate of 60000 m$^3$/h. The concentration of platinum metals in sorbent was 2.5% and recovery degree was 91% of the total amount of the platinum metals involved by the gas.

Example 3

In accordance with the example 1 a composite material having the following final composition: MgO—35, CaO—50, Cl$^-$—15 was produced. The layer of sorbent of 100 high was exploited in an industrial reactor during 1500 h under pressure of 0.6 MPa and the reaction gas flow rate of 55000 m$^3$/h. The concentration of platinum metals in sorbent was 1.5% and recovery degree was 67% of the total amount of the platinum metals involved by the gas.

Thus, the use of the suggested composite material as a sorbent at the stage of ammonia oxidation in the process of nitric acid production allows to recover up to 90% of precious metal particles, with their content in the used sorbent not less then 2.5%. The sorbent can be produced in the form of granules of any shape by using the method of wet molding or extrusion by means of standard equipment. Sorbent production does not require expensive reagents. The sorbent has the moisture and acid resistance that meet the requirements of the industrial production. The strength of the sorbent granules is 6–8 MPa.

References

1. Atroschenko V. I., Kargin S. I. Technologija azotnoj kisloty. Moskva: Khimija, 1970, 497 pp.
2. Kozub P. A, Trusov N. V., Gryn G. I, Prezhdo V. V. Investigation of the operation time dependence of the yield of ammonia conversion to nitrogen (II) oxide by platinum catalyst sets.—J. Chem. Technol. and Biotechnol., V76, 2001, pp. 147–152.
3. Savenkov A. S., Naboka M. N., Lubchenko V. Ya. Katalizatory v azotnoj promyshlennosti, Kharkov: Vyshcha shkola, 1977, 143 pp.
4. U.S. Pat. No. 3,398,332, B22F 3/00, 16.12.1973.
5. U.S. Pat. No. 4,239,833, B22F 3/00, 16.12.1980.
6. RU Patent No 2009995, CO1B21/26, B01J23/56, Publ. 30.03.1994.
7. GB Patent No 830674, Publ. 16.03.1960.
8. USSR Author Certificate No 1720706, B01J 20/30, Publ. 23.03.1992.

What is claimed is:

1. A method of recovering platinum particles from reaction gas flow in nitric acid production comprising:
    passing the reaction gas through a layer of a sorbent to absorb platinum particles, said sorbent being formed by a granular composite material comprising 50–75% calcium oxide by weight, 20–35% magnesium oxide by weight and 5–15% by weight of at least one chloride selected from the group consisting of calcium chloride and magnesium chloride; and
    extracting the absorbed platinum particles from the sorbent.

2. A granular composite material for recovering platinum particles from reaction gas flow in nitric acid production, comprising 50–75% calcium oxide by weight; 20–35% of magnesium oxide by weight; and 5–15% by weight of at least one chloride selected from the group consisting of calcium chloride and magnesium chloride.

* * * * *

UNITED STATES PATENT AND TRADEMARK OFFICE
CERTIFICATE OF CORRECTION

PATENT NO.  : 6,899,746 B2
DATED       : May 31, 2005
INVENTOR(S) : Antonina Olesandrivna Lavrenko et al.

It is certified that error appears in the above-identified patent and that said Letters Patent is hereby corrected as shown below:

<u>Title page,</u>
Item [75], Inventor, "Dleksiy" should read as -- Oleksiy --.

Signed and Sealed this

Thirteenth Day of September, 2005

JON W. DUDAS
*Director of the United States Patent and Trademark Office*